US012601888B2

(12) United States Patent
Chen

(10) Patent No.: US 12,601,888 B2
(45) Date of Patent: Apr. 14, 2026

(54) LENS MODULE AND PROJECTION DEVICE

(71) Applicant: Coretronic Corporation, Hsin-Chu (TW)

(72) Inventor: Mi-Wen Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 783 days.

(21) Appl. No.: 17/678,063

(22) Filed: Feb. 23, 2022

(65) Prior Publication Data

US 2023/0266558 A1 Aug. 24, 2023

(51) Int. Cl.
*G02B 7/02* (2021.01)
*G03B 21/14* (2006.01)

(52) U.S. Cl.
CPC ............. *G02B 7/02* (2013.01); *G03B 21/147* (2013.01)

(58) Field of Classification Search
CPC .......... G02B 7/02; G02B 7/008; G02B 7/021; G02B 7/026; G02B 7/028; G02B 7/022; G03B 21/147; G03B 21/145; G03B 21/16; G03B 21/204; G03B 21/208; G03B 21/20; G03F 7/70825; G03F 7/70833
See application file for complete search history.

(56) References Cited

U.S. PATENT DOCUMENTS

| | | | | |
|---|---|---|---|---|
| 5,461,444 | A * | 10/1995 | Okura | G02B 7/026 396/529 |
| 5,680,260 | A * | 10/1997 | Farcella | G02B 7/022 359/818 |
| 7,154,684 | B2 * | 12/2006 | Shibazaki | G02B 13/143 359/813 |
| 10,816,920 | B1 * | 10/2020 | Hsu | G03B 21/145 |
| 2003/0076602 | A1 * | 4/2003 | Nishikawa | G03F 7/70933 359/822 |
| 2008/0259469 | A1 * | 10/2008 | Arai | G03F 7/709 396/529 |
| 2008/0278828 | A1 * | 11/2008 | Rau | F16F 7/01 359/811 |
| 2016/0216598 | A1 * | 7/2016 | Takehana | G03B 21/142 |
| 2020/0249551 | A1 * | 8/2020 | Pan | G02B 27/0006 |

FOREIGN PATENT DOCUMENTS

CN 208224572 12/2018

* cited by examiner

*Primary Examiner* — Matthew Y Lee
(74) *Attorney, Agent, or Firm* — JCIPRNET

(57) ABSTRACT

A lens module includes a lens fixing device and a base. The lens fixing device includes: a lens holder, a lens, a plurality of elastic sheets, and a shielding sheet. The lens is assembled on the lens holder. The plurality of elastic sheets is locked on the lens holder and pressed around an edge of the lens. The shielding sheet is arranged on at least one of the plurality of elastic sheets, and is located on a transmission path of an excitation light beam to prevent the excitation light beam from directly irradiating the at least one of the plurality of elastic sheets. The lens holder is assembled on the base.

18 Claims, 8 Drawing Sheets

100

LENS MODULE AND PROJECTION DEVICE

BACKGROUND

Technical Field

The disclosure relates to a lens module and a projection device.

Description of Related Art

In a lens module of a projection device, the lens is typically assembled on the lens holder by using elastic sheets to press the lens on the lens holder. Since the elastic sheets press the lens through point-like contact areas, the contact areas between the elastic sheets and the lens are small, and the stresses on the contact areas are large. Thus, when the laser irradiates on the lens, the lens and the lens holder will be heat up rapidly, and so do the contact areas between the elastic sheets and the lens. When the contact areas between the elastic sheets and the lens being heat up, the thermal stress between the elastic sheets and the lens may increase and damage the lens.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

In order to achieve one or part or all of the above objectives or other objectives, an embodiment of the disclosure provides a lens module. The lens module includes a lens fixing device and a base. The lens fixing device includes: a lens holder, a lens, a plurality of elastic sheets, and a shielding sheet. The lens is assembled on the lens holder. The plurality of elastic sheets is locked on the lens holder and pressed around an edge of the lens. The shielding sheet is arranged on at least one of the plurality of elastic sheets, and is located on a transmission path of an excitation light beam to prevent the excitation light beam from directly irradiating the at least one of the plurality of elastic sheets. The lens holder is assembled on the base.

According to an embodiment of the disclosure, the lens holder and the base are provided with through holes corresponding to the at least one of the plurality of elastic sheets provided with the shielding sheet to reduce a temperature of the at least one of the plurality of elastic sheets.

According to an embodiment of the disclosure, a number of the plurality of elastic sheets is equal to or greater than three.

According to an embodiment of the disclosure, the plurality of elastic sheets is evenly distributed around the edge of the lens.

According to an embodiment of the disclosure, a number of the plurality of elastic sheets is equal to three, and positions of the plurality of elastic sheets are separated by an angle of 100-140 degrees.

According to an embodiment of the disclosure, the positions of the plurality of elastic sheets are separated by an angle of 120 degrees.

According to an embodiment of the disclosure, a material of the shielding sheet is aluminum.

According to an embodiment of the disclosure, each of the plurality of elastic sheets extends from the edge of the lens to an arc direction of a curved surface of the lens, and a surface of each of the plurality of elastic sheets fits the curved surface of the lens.

According to an embodiment of the disclosure, a lens module is provided. The lens module includes: a lens fixing device and a base. The lens fixing device includes: a lens holder, a lens, a washer, a plurality of elastic sheets and a shielding sheet. The lens is assembled on the lens holder. The washer is disposed between the lens and the lens holder. The plurality of elastic sheets is locked on the lens holder and pressed around an edge of the lens. The lens holder is assembled on the base.

According to an embodiment of the disclosure, a material of the washer is a low thermal conductivity material.

According to an embodiment of the disclosure, the lens module further comprises: a shielding sheet, arranged on at least one of the plurality of elastic sheets, and located on a transmission path of an excitation light beam to prevent the excitation light beam from directly irradiating the at least one of the plurality of elastic sheets.

According to an embodiment of the disclosure, the lens holder and the base are provided with through holes corresponding to the at least one of the plurality of elastic sheets provided with the shielding sheet to reduce a temperature of the at least one of the plurality of elastic sheets.

According to an embodiment of the disclosure, a material of the shielding sheet is aluminum.

According to an embodiment of the disclosure, each of the plurality of elastic sheets extends from the edge of the lens to an arc direction of a curved surface of the lens, and a surface of each of the plurality of elastic sheets fits the curved surface of the lens.

According to an embodiment of the disclosure, a projection device is provided. The projection device includes: an illumination system, a light valve, and a projection lens. The illumination system is configured to provide an illumination light beam. The light valve is arranged on a transmission path of the illumination light beam to convert the illumination light beam into an image light beam. The projection lens is arranged on the transmission path of the image light beam. The illumination system includes: a light source, a lens module, and a wavelength conversion device. The light source is configured to provide an excitation light beam. The lens module is arranged on a transmission path of the excitation light beam. The lens module includes: a lens fixing device and a base. The lens fixing device includes: a lens holder, a lens, a plurality of elastic sheets, and a shielding sheet. The lens is assembled on the lens holder and is arranged on the transmission path of the excitation light beam. The plurality of elastic sheets is locked on the lens holder and pressed around an edge of the lens. The shielding sheet is arranged on at least one of the plurality of elastic sheets, and is located on a transmission path of an excitation light beam to prevent the excitation light beam from directly irradiating the at least one of the plurality of elastic sheets. The lens holder is assembled on the base. The wavelength conversion device is arranged on the transmission path of the excitation light beam and configured to convert the excitation light beam into a converted light beam, and emitted the illumination light beam including the excitation light beam and the converted light beam.

According to an embodiment of the disclosure, the excitation light beam directly enters the wavelength conversion device after leaving the lens module.

According to an embodiment of the disclosure, the lens holder and the base are provided with through holes corresponding to the at least one of the plurality of elastic sheets provided with the shielding sheet to reduce a temperature of the at least one of the plurality of elastic sheets.

According to an embodiment of the disclosure, each of the plurality of elastic sheets extends from the edge of the lens to an arc direction of a curved surface of the lens, and a surface of each of the plurality of elastic sheets fits the curved surface of the lens.

According to an embodiment of the disclosure, the lens module further comprises a washer disposed between the lens and the lens holder, a material of the washer is a low thermal conductivity material.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
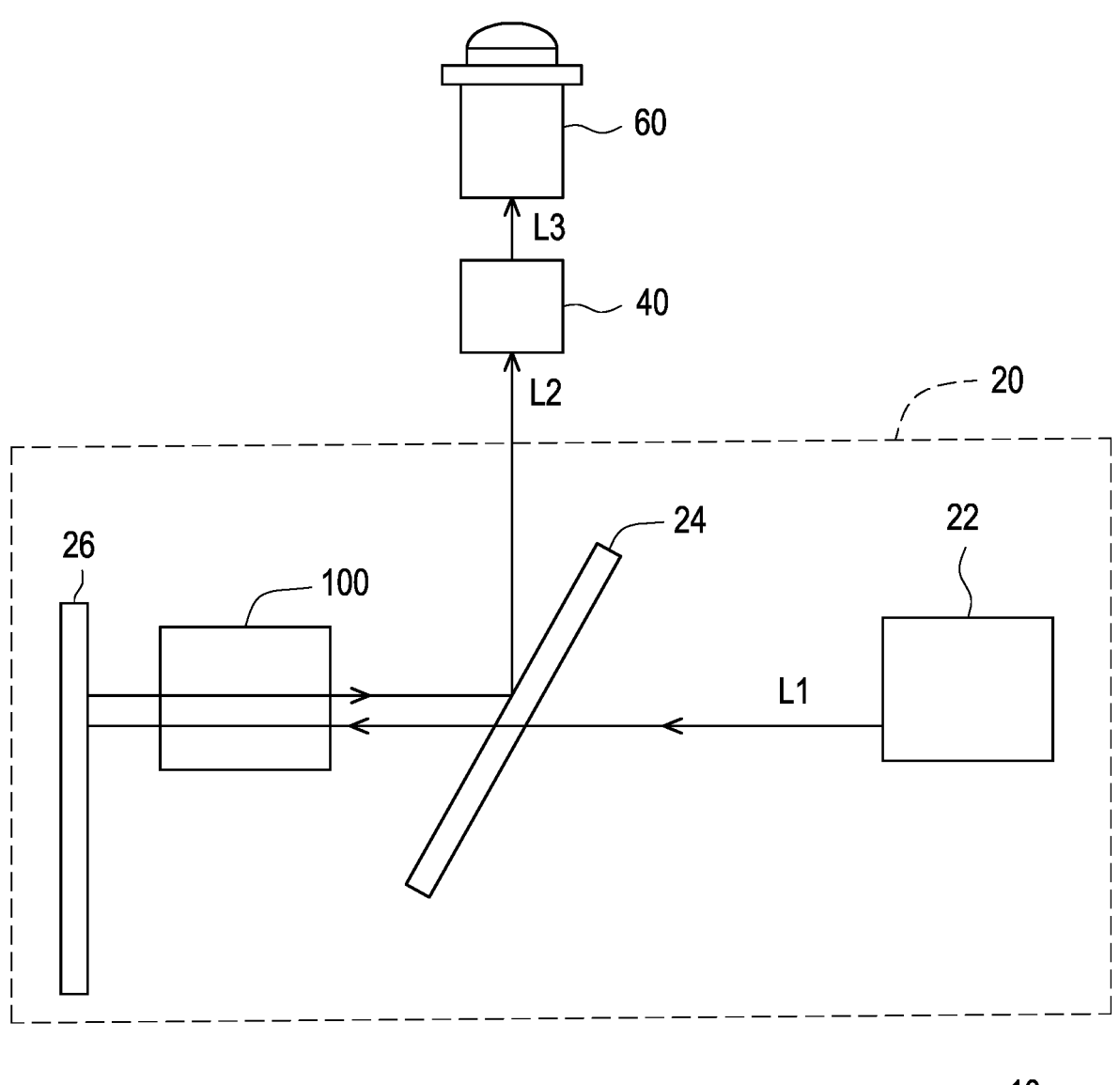
FIG. 1 is a schematic diagram of a projection device according to an embodiment of the disclosure.

FIG. 1 is a schematic diagram of a projection device according to an embodiment of the disclosure. Please refer to FIG. 1. A projection device 10 in the embodiment includes an illumination system 20, a light valve 40, and a projection lens 60.

The illumination system 20 is configured to emit an excitation light beam L1, transform an excitation light beam L1 to an illumination light beam L2, and provide the illumination light beam L2 to the light valve 40. The illumination system 20 includes a light source 22, a lens module 100, and a wavelength conversion device 26.

The light source 22 is configured to provide an excitation light beam L1. In some embodiments, the light source 22 may be a laser light source or the like, and the disclosure is not limited thereto.

The excitation light beam L1 pass through a beam splitter 24 and enters the lens module 100. The lens module 100 is arranged on a transmission path of the excitation light beam L1. The lens module 100 includes a lens fixing device and a base, which will be described in detail later.

The wavelength conversion device 26 is arranged on the transmission path of the excitation light beam L1. The excitation light beam L1 directly enters the wavelength conversion device 26 after leaving the lens module 100. The wavelength conversion device 26 is configured to convert the excitation light beam L1 into a converted light beam, and emitted the illumination light beam L2 including the excitation light beam L1 and the converted light beam. In some embodiments, the wavelength conversion device 26 is, for example, a phosphor wheel or a plate with phosphor powder, and the disclosure is not limited thereto.

The light valve 40 is arranged on a transmission path of the illumination light beam L2 to convert the illumination light beam L2 into an image light beam L3. In some embodiments, the light valve 40 is, for example, a digital micro-mirror device (DMD) or a liquid-crystal-on-silicon panel (LCOS panel). However, according to other embodiments, the light valve 40 may also be a transparent liquid crystal panel or other spatial light modulator, and the disclosure is not limited thereto.

The projection lens 60 is arranged on the transmission path of the image light beam L3 to project the image light beam L3 outside the projection device 10, such as on a screen (not shown) outside the projection device 10, to form an image. The projection lens 60 includes, for example, a combination of one or more optical lenses with refractive power. The optical lens includes, for example, a non-planar lens such as a biconcave lens, a biconvex lens, a concave-convex lens, a convex-concave lens, a plano-convex lens, a plano-concave lens, etc., or various combinations thereof. According to an embodiment, the projection lens 60 may also include a flat optical lens. Here, the embodiment does not limit the form and the type of the projection lens 60.

Figure 2:
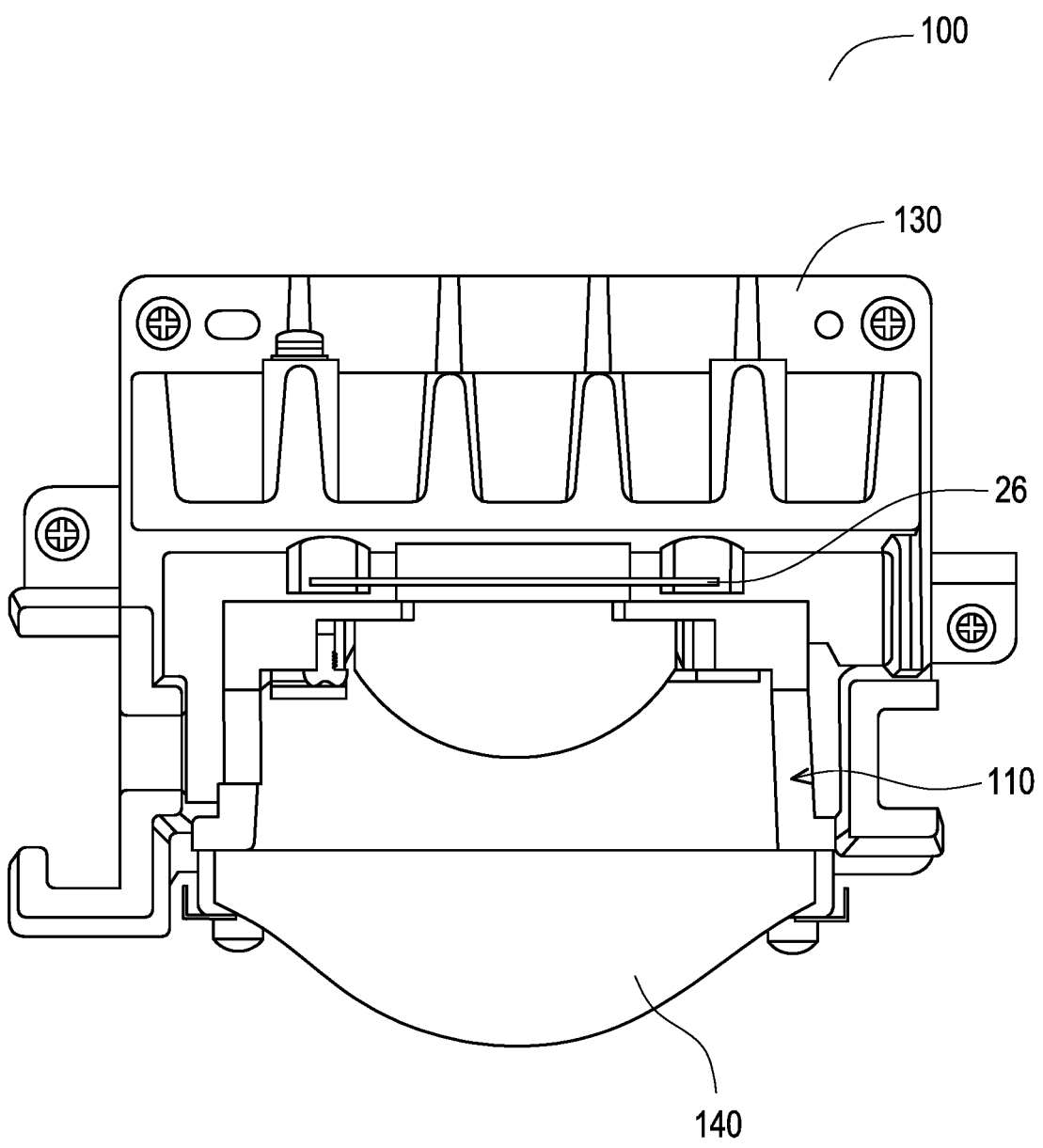
FIG. 2 is a cross-sectional view from the top of a lens module according to an embodiment of the disclosure.

FIG. 2 is a cross-sectional view from the top of a lens module according to an embodiment of the disclosure. Please refer to FIG. 2. The lens module 100 includes a lens fixing device 110 and a base 130. The lens fixing device 110 is assembled on the base 130. The lens module 100 also includes a lens 140, which is arranged on the transmission path of the excitation light beam L1. In this embodiment, the wavelength conversion device 26 is also arranged on the base 130. In some embodiments, the wavelength conversion device 26 is arranged outside the base 130 or outside the lens module 100.

Figure 3A:
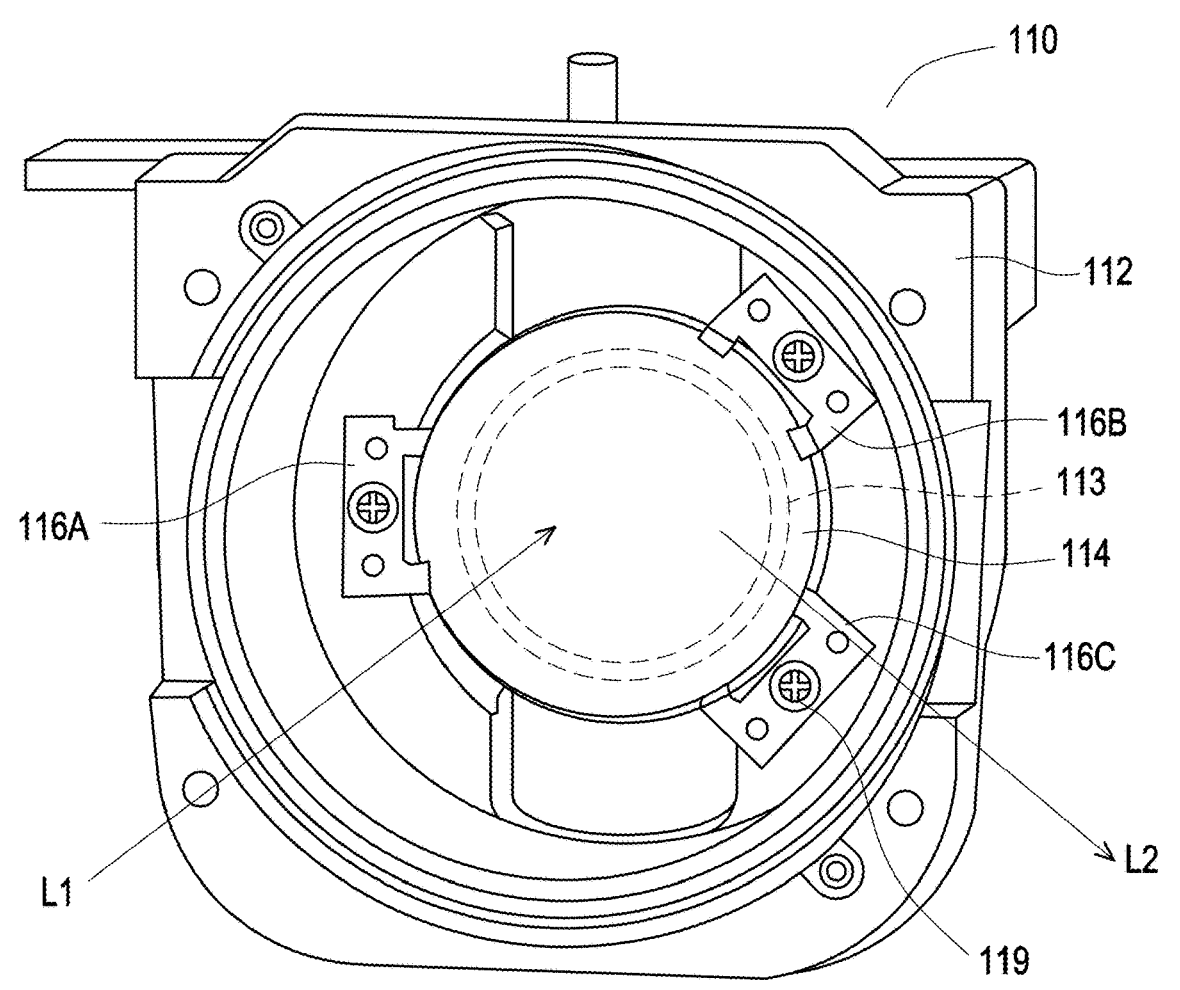
FIG. 3A is a schematic diagram of a lens fixing device according to an embodiment of the disclosure.

FIG. 3A is a schematic diagram of a lens fixing device according to an embodiment of the disclosure. Please refer to FIG. 3A. The lens fixing device 110 includes a lens holder 112, a washer 113, a lens 114, a plurality of elastic sheets 116A, 116B, and 116C.

The lens holder 112 is configured to hold the lens 114. In some embodiments, the lens holder 112 is made of metal, such as aluminum, to reduce the weight and provide a stable structure.

The lens 114 is assembled on the lens holder 112. The lens 114 is arranged on the transmission path of the excitation light beam L1 and guides the excitation light beam L1 to the wavelength conversion device 26 (not shown). The lens 114 is also on the transmission path of the illumination light beam L2 emitted from the wavelength conversion device 26. In some embodiments, the lens 114 is a convex lens, but the disclosure is not limited thereto.

The washer 113 is disposed between the lens holder 112 and the lens 114. The washer 113 is made of low thermal conductivity material, to avoid heat transmission between the lens 114 and the lens holder 112. In some embodiments, a material of the washer 113 is a low thermal conductivity material, for example, a mica sheet, but is not limited thereto.

In order to assemble the lens 114 on the lens holder 112, as shown in FIG. 3A, the plurality of elastic sheets 116A, 116B, and 116C is locked on the lens holder 112 and press around an edge 114E of the lens 114. As shown in FIG. 3A, three elastic sheets 116A, 116B, and 116C are locked on the lens holder 112 by the screws 119. In some embodiments, the elastic sheets 116A, 116B, and 116C are thin metal sheets made of aluminum or other metals, but the disclosure is not limited thereto.

By using three elastic sheets 116A, 116B, and 116C to lock the lens 114 on the lens holder 112, the stability of the lens 114 is improved from vibration or dropping, which may affect the quality of the image emitted by the projection device 10. Furthermore, by using three elastic sheets 116A, 116B, and 116C to lock the lens 114, the lens 114 may be more accurately positioned at the center of the light axis, to improve the stability of the quality of the image emitted by the projection device 10.

Figure 3B:
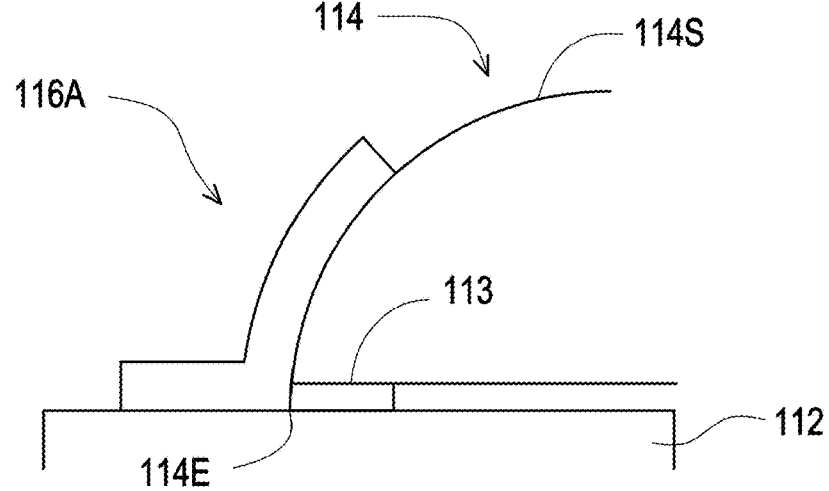
FIG. 3B is a partial view of a schematic diagram of a lens fixing device according to an embodiment of the disclosure.

FIG. 3B is a partial view of a schematic diagram of a lens fixing device according to an embodiment of the disclosure. Please refer to FIG. 3B. Here we use the elastic sheet 116A as example, but the following is also true for the other elastic sheets 116B and 116C. As shown in FIG. 3B, one end of the elastic sheet 116A is locked on the lens holder 112, and pressed on the edge 114E of the lens 114. The other end of the elastic sheet 116A extends from the edge 114E of the lens 114 to an arc direction of a curved surface 114S of the lens 114. Also, a surface of the elastic sheet 116A fits the curved surface 114S of the lens 114. With the elastic sheet 116A extends from the edge 114E of the lens 114 to the arc direction of the curved surface 114S of the lens 114, and the surface of the elastic sheet 116A fits the curved surface 114S of the lens 114, the elastic sheet 116A may press the lens 114 more tightly so the lens 114 and the washer 113 can be fixed on the lens holder 112 more effectively, and further reduces the displacement of the lens 114. By fitting the surface of the elastic sheet 116A to the curved surface 114S of the lens 114, this prevents the elastic sheet 116A from scratching the curved surface 114S of the lens 114.

Furthermore, when the surface of the elastic sheet 116A fits the curved surface 114S of the lens 114, the contact area between the elastic sheet 116A and the lens 114 is increased. Therefore, when the excitation light beam L1 irradiating the lens 114, and heating up the elastic sheet 116A, the heat accumulated in the elastic sheet 116A may be distributed to the lens 114 more rapidly through the contact area of the curved surface 114S. This avoids the heat accumulation in the elastic sheet 116A, and prevents the lens damage due to thermal stress between the elastic sheet 116A and the lens 114.

Figure 4:
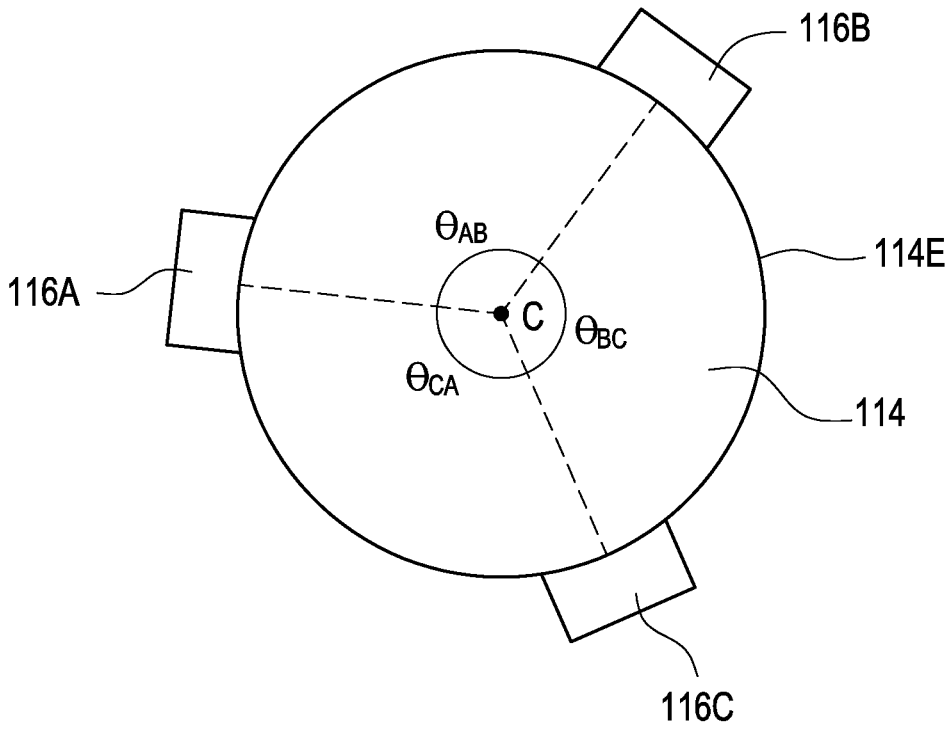
FIG. 4 is a schematic diagram showing the arrangement of the plurality of elastic sheets according to an embodiment of the disclosure.

FIG. 4 is a schematic diagram showing the arrangement of the plurality of elastic sheets according to an embodiment of the disclosure. Please refer to FIG. 4. In this embodiment, the number of elastic sheets is three, which are elastic sheets 116A, 116B, and 116C, however, the number of elastic sheets may be equal to or more than three, depending on the size of the lens 114, and the disclosure is not limited thereto.

As shown in FIG. 4, the plurality of elastic sheets 116A, 116B, and 116C is distributed around the edge 114E of the lens 114. As shown in FIG. 4, the positions of the elastic sheets 116A, 116B, and 116C, from the center C of the lens 114 are separated by angles of $\theta_{AB}$, $\theta_{BC}$, and $\theta_{CA}$, respectively. In some embodiments, the angles of $\theta_{AB}$, $\theta_{BC}$, and $\theta_{CA}$ are between 100-140 degrees. In some embodiments, the angles of $\theta_{AB}$, $\theta_{BC}$, and $\theta_{CA}$ are evenly distributed, or separated by an angle of 120 degrees. By evenly distributing the elastic sheets 116A, 116B, and 116C around the edge 114E of the lens 114, the stability of the lens 114 is improved.

Figure 5:
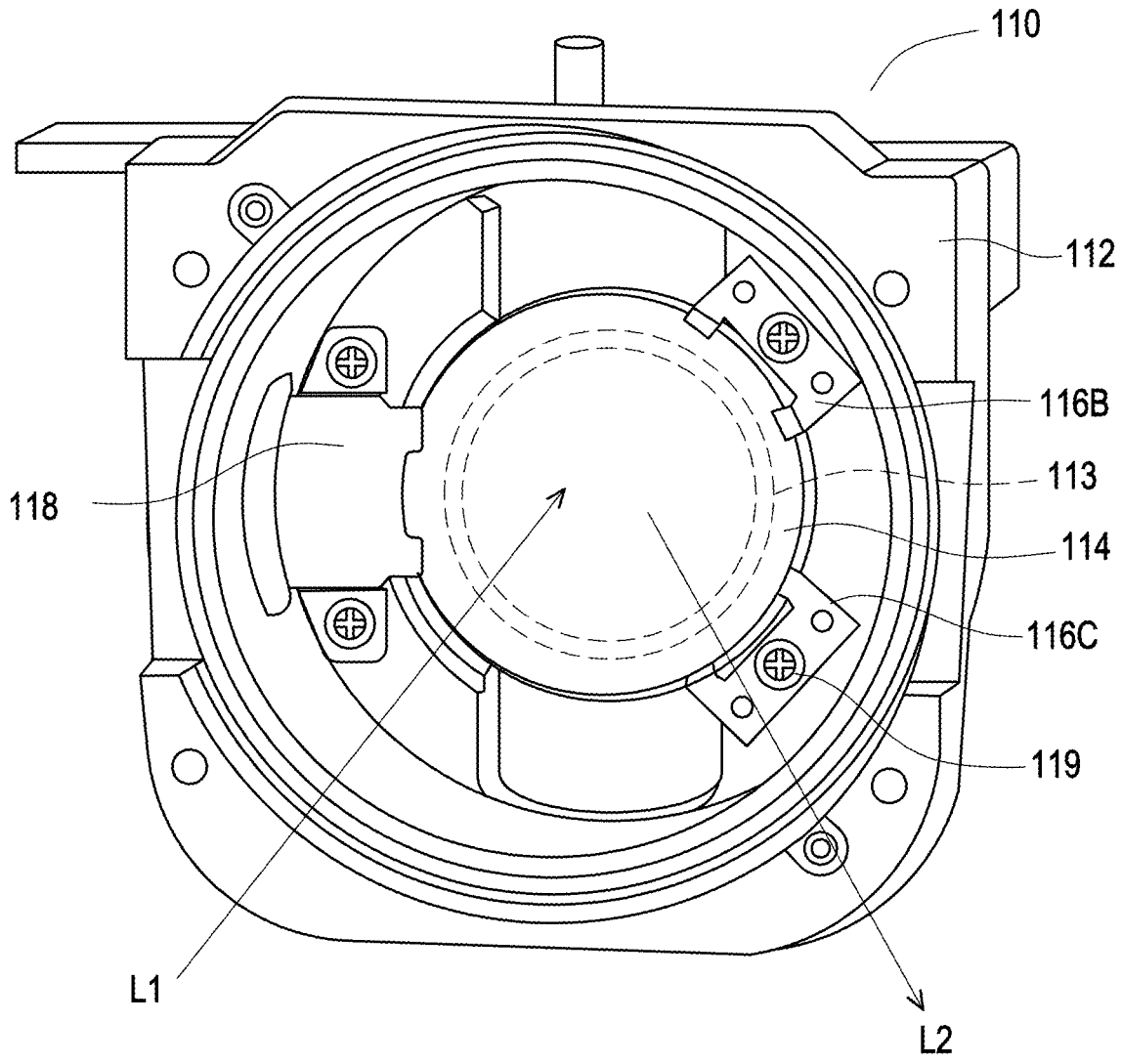
FIG. 5 is a schematic diagram of a lens fixing device according to an embodiment of the disclosure.

FIG. 5 is a schematic diagram of a lens fixing device according to an embodiment of the disclosure. The transmission path of the incoming excitation light beam L1 typically enters the lens 114 at a position slightly off the center of the lens 114. For example, as shown in FIG. 3A, the excitation light beam L1 enters the lens 114 at a position near the elastic sheet 116A. When the excitation light beam L1 hits the surface of the lens 114, some stray light is generated and heat up the surrounding elastic sheets 116A, 116B, and 116C. Since the elastic sheet 116A is the closest elastic sheet among the three elastic sheets 116A, 116B, and 116C to the excitation light beam L1, the elastic sheet 116A absorbs more heat from the stray light the excitation light beam L1 then the other two elastic sheets 116B and 116C, and may increase the probability of lens damage due to the increased thermal stress.

To prevent the elastic sheet 116A from being heat up by the stray light generated from the off-axis incoming excitation light beam L1, a shielding sheet 118 is arranged on the elastic sheet 116A and located on the transmission path of the excitation light beam L1 to prevent the stray light generated from the excitation light beam L1 from directly irradiating the elastic sheet 116A. In some embodiments, the shielding sheet 118 may also be arranged on the elastic sheets 116B and/or 116C, and the disclosure is not limited thereto.

The shielding sheet 118 is used to prevent the elastic sheet 116A from being irradiated by the stray light. When the high-power incoming excitation light beam irradiating the shielding sheet 118, if the material of the shielding sheet 118 contains carbon, the surface of the shielding sheet may turn black due to the carbon contained in the shielding sheet 118. The blackened shielding sheet 118 may reduce the shielding power to protect the elastic sheet 116A from being irradiated. Thus, in some embodiments, the material of the shielding sheet 118 is a metal without carbon, such as aluminum, but the disclosure is not limited thereto.

Figure 6A:
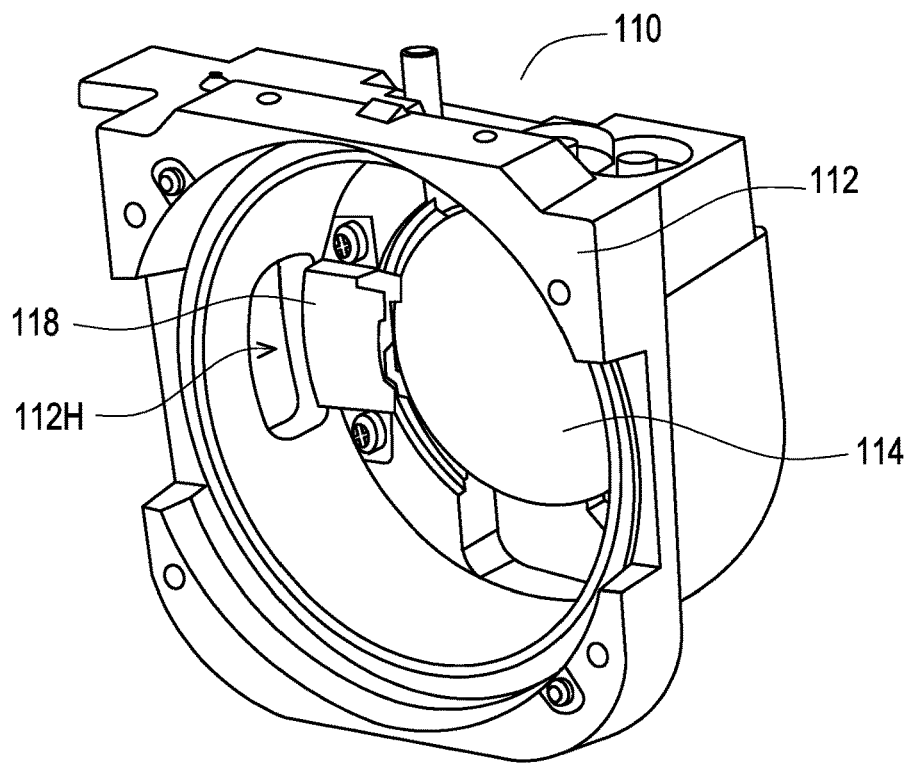
FIG. 6A is a schematic diagram of a lens fixing device according to an embodiment of the disclosure.
Figure 6B:
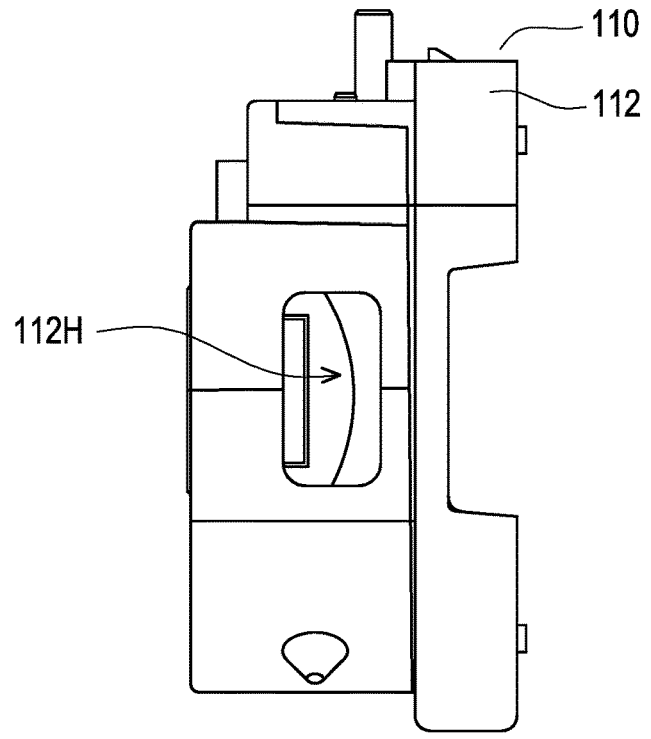
FIG. 6B is a side view of a lens fixing device according to an embodiment of the disclosure.

FIG. 6A is a schematic diagram of a lens fixing device according to an embodiment of the disclosure. FIG. 6B is a side view of a lens fixing device according to an embodiment of the disclosure. Please refer to FIG. 6A and FIG. 6B. When the incoming excitation light beam L1 irradiates the lens 114, the lens 114 and the lens holder 112 will be heat up. In order to release the heat from the lens 114 and the lens holder 112, the lens holder 112 is provided with a through hole 112H on the side wall of the lens holder. The position of the through hole 112H corresponds to the elastic sheet 116A provided with the shielding sheet 118 to reduce a temperature of the elastic sheet 116A. The position of the through hole 112H is selected because the excitation light beam L1 is closer to the elastic sheet 116A, thus the temperature around the elastic sheet 116A may increase more rapidly than the other elastic sheets 116B and 116C. With the through hole 112H of the lens holder 112, the air within the lens holder 112 may flow out from the lens holder 112 through the through hole 112H, to remove the heat generated due to the irradiation of the excitation light beam L1 and to reduce the temperature of the elastic sheet 116A.

Figure 7A:
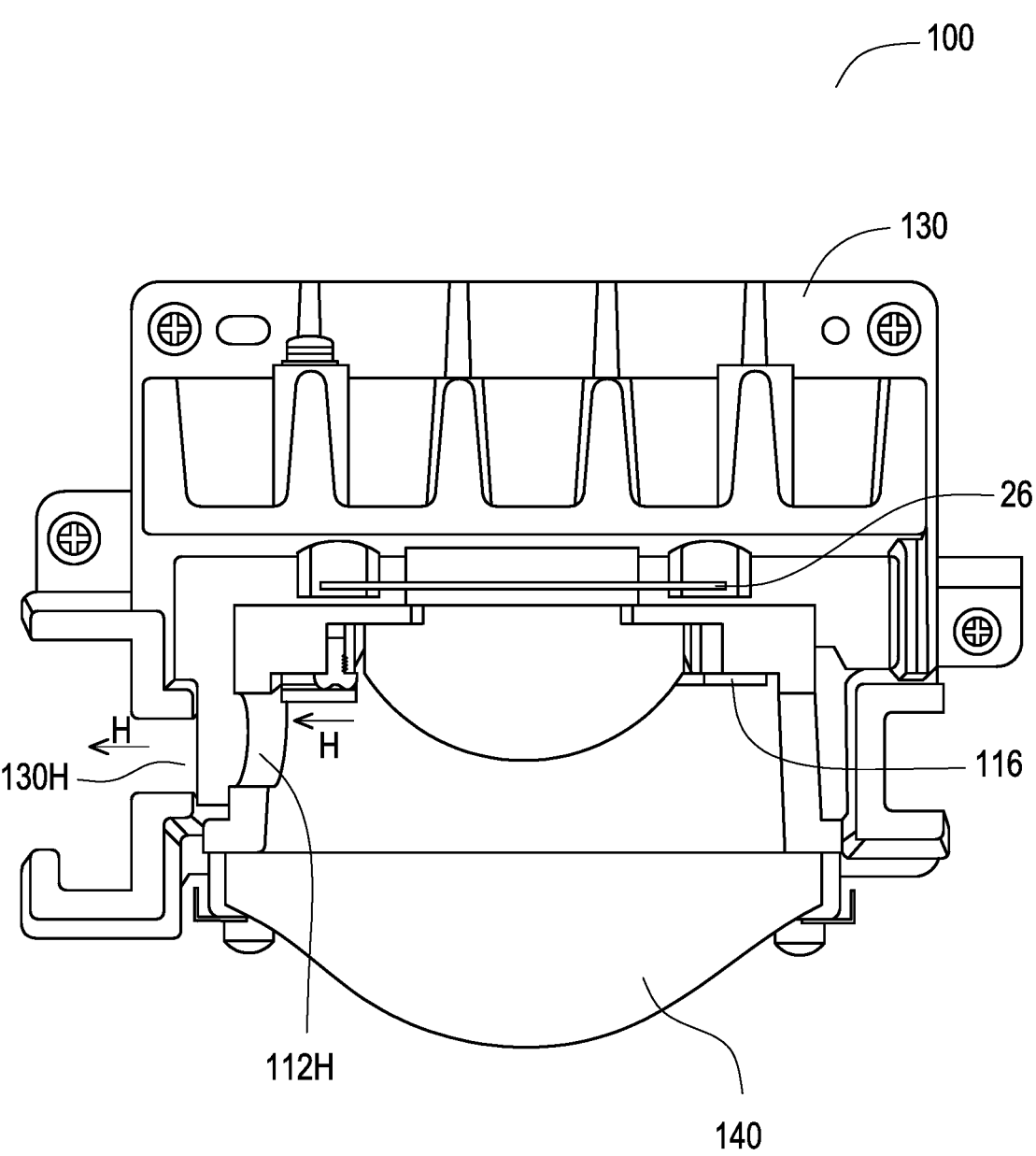
FIG. 7A is a cross-sectional view from the top of a lens module according to an embodiment of the disclosure.
Figure 7B:
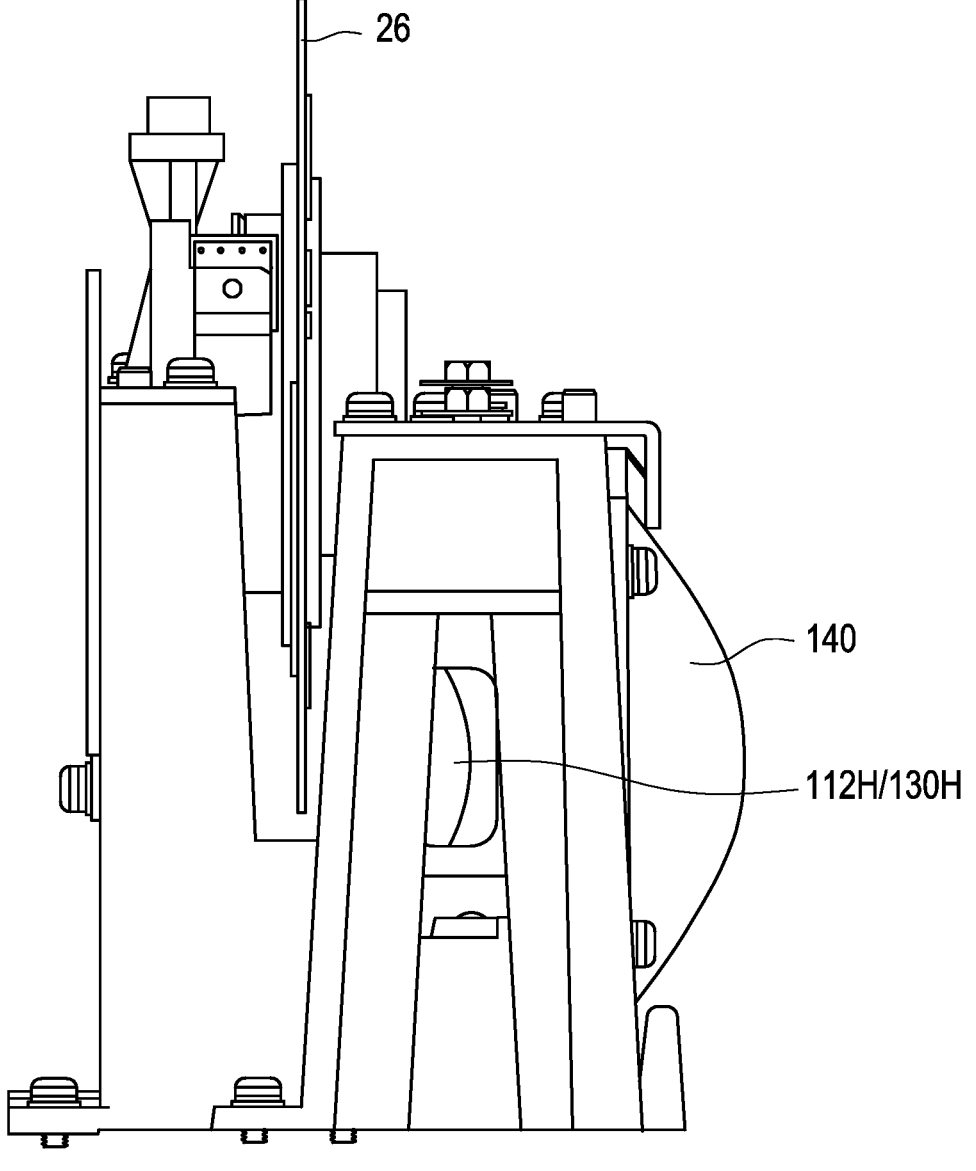
FIG. 7B is a side view of a lens module according to an embodiment of the disclosure.

FIG. 7A is a cross-sectional view from the top of a lens module according to an embodiment of the disclosure. FIG. 7B is a side view of a lens module according to an embodiment of the disclosure. Please refer to FIG. 7A and FIG. 7B. The lens holder 112 is assembled on the base 130. The lens fixing device 110 and the base 130 together forms the lens module 100. The lens holder 112 is provided with a through hole 112H corresponding to the elastic sheet 116A. Furthermore, the base 130 is also provided with a through hole 130H corresponding to the elastic sheet 116A. In other words, the position of the through hole 112H of the lens holder 112 matches the position of the through hole 130H of the base 130. With the through hole 112H of the lens holder 112 and the through hole 130H of the base 130, the air within the lens holder 112 may flow out from the lens holder 112 through the through hole 112H of the lens holder 112 and the through hole 130H of the base 130, to remove the heat H generated due to the irradiation of the excitation light beam L1 from the lens module 100 and to reduce the temperature of the elastic sheet 116A.

When the excitation light beam irradiates the lens module, the elastic sheets fixing the lens may be heat up and break the lens due to excess thermal stress. In this invention, by fixing the lens with elastic sheets extending from the edge of the lens to an arc direction of a curved surface of the lens, and a surface of each of the plurality of elastic sheets fits the curved surface of the lens, the heat in the elastic sheets may rapidly transmitted to the lens to avoid heat accumulation in the elastic sheets. By using a shielding sheet located on a transmission path of the excitation light beam, the shielding sheet may effectively shield the elastic sheet from being radiated by the stray light generated by the excitation light beam, and further reduce the temperature of the elastic sheet. Furthermore, through holes on the lens holder and the base of the lens module may further lower the temperature of the lens and the elastic sheets. Thus, the temperature of the lens module may be kept stable when irradiated by the excitation light beams.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the present disclosure is intended to be dedicated to the public regardless of whether the element or component is explicitly recited in the following claims.

What is claimed is:

1. A lens module, comprising: a lens fixing device and a base;
wherein
the lens fixing device, comprises:
a lens holder, assembled on the base;
a lens, assembled on the lens holder;

a plurality of elastic sheets, locked on the lens holder and pressed around an edge of the lens; and a shielding sheet, arranged on at least one of the plurality of elastic sheets, a length of the shielding sheet in a radial direction of the lens being larger than a length of the at least one of the plurality of elastic sheets in the radial direction of the lens, wherein the lens is configured to receive an excitation light beam in a manner that a main optical axis of the excitation light beam is incident on an incident position of the lens where the incident position has an offset from a center axis of the lens, and the at least one of the plurality of elastic sheets is arranged closer to the incident position of the lens than others of the plurality of elastic sheets.

2. The lens module according to claim 1, wherein the lens holder and the base are provided with through holes corresponding to the at least one of the plurality of elastic sheets provided with the shielding sheet to reduce a temperature of the at least one of the plurality of elastic sheets.

3. The lens module according to claim 1, wherein a number of the plurality of elastic sheets is equal to or greater than three.

4. The lens module according to claim 1, wherein the plurality of elastic sheets is evenly distributed around the edge of the lens.

5. The lens module according to claim 1, wherein a number of the plurality of elastic sheets is equal to three, and positions of the plurality of elastic sheets are separated by an angle of 100-140 degrees.

6. The lens module according to claim 5, wherein the positions of the plurality of elastic sheets are separated by an angle of 120 degrees.

7. The lens module according to claim 1, wherein a material of the shielding sheet is aluminum.

8. The lens module according to claim 1, wherein each of the plurality of elastic sheets extends from the edge of the lens to an arc direction of a curved surface of the lens, and a surface of each of the plurality of elastic sheets fits the curved surface of the lens.

9. A lens module, comprising: a lens fixing device and a base;

wherein the lens fixing device, comprises:

a lens holder, assembled on the base;

a lens, assembled on the lens holder;

a washer, disposed between the lens and the lens holder;

a plurality of elastic sheets, wherein one end of each of the plurality of elastic sheets is locked on the lens holder and pressed around an edge of the lens, the other end of each of the plurality of elastic sheets extends from the edge of the lens to an arc direction of a curved surface of the lens, the other end of each of the plurality of elastic sheets does not contact the lens holder, and a surface of each of the plurality of elastic sheets fits and directly contacts the curved surface of the lens.

10. The lens module according to claim 9, wherein a material of the washer is a low thermal conductivity material.

11. The lens module according to claim 9, further comprising:

a shielding sheet, arranged on at least one of the plurality of elastic sheets, and located on a transmission path of an excitation light beam to prevent the excitation light beam from directly irradiating the at least one of the plurality of elastic sheets.

12. The lens module according to claim 9, wherein the lens holder and the base are provided with through holes corresponding to the at least one of the plurality of elastic sheets provided with the shielding sheet to reduce a temperature of the at least one of the plurality of elastic sheets.

13. The lens module according to claim 9, wherein a material of the shielding sheet is aluminum.

14. A projection device, comprising:

an illumination system, configured to provide an illumination light beam;

a light valve, arranged on a transmission path of the illumination light beam to convert the illumination light beam into an image light beam; and a projection lens, arranged on the transmission path of the image light beam, wherein the illumination system comprises: a light source, a lens module, and a wavelength conversion device, wherein the light source is configured to provide an excitation light beam, the lens module is arranged on a transmission path of the excitation light beam, and the wavelength conversion device is arranged on the transmission path of the excitation light beam, is configured to convert the excitation light beam into a converted light beam, and is emitted the illumination light beam including at least one of the excitation light beam and the converted light beam, wherein the lens module comprises: a lens fixing device and a base; wherein, the lens fixing device, comprises:

a lens holder, assembled on the base;

a lens, assembled on the lens holder and arranged on the transmission path of the excitation light beam; and a plurality of elastic sheets, locked on the lens holder and pressed around an edge of the lens; and a shielding sheet, arranged on at least one of the plurality of elastic sheets, a length of the shielding sheet in a radial direction of the lens being larger than a length of the at least one of the plurality of elastic sheets in the radial direction of the lens, wherein the lens is configured to receive the excitation light beam in a manner that a main optical axis of the excitation light beam is incident on an incident position of the lens where the incident position has an offset from a center axis of the lens, and the at least one of the plurality of elastic sheets is arranged closer to the incident position of the lens than others of the plurality of elastic sheets.

15. The projection device according to claim 14, wherein the excitation light beam directly enters the wavelength conversion device after leaving the lens module.

16. The projection device according to claim 14, wherein the lens holder and the base are provided with through holes corresponding to the at least one of the plurality of elastic sheets provided with the shielding sheet to reduce a temperature of the at least one of the plurality of elastic sheets.

17. The projection device according to claim 14, wherein each of the plurality of elastic sheets extends from the edge of the lens to an arc direction of a curved surface of the lens, and a surface of each of the plurality of elastic sheets fits the curved surface of the lens.

18. The projection device according to claim 14, wherein the lens module further comprises a washer disposed between the lens and the lens holder, a material of the washer is a low thermal conductivity material.

\* \* \* \* \*